United States Patent [19]

Gilbreath et al.

[11] Patent Number: 5,024,292
[45] Date of Patent: Jun. 18, 1991

[54] PORTABLE LADDER ASSEMBLY FOR TRUCK TRAILERS

[75] Inventors: John R. Gilbreath; Bobbie L. Gilbreath, both of Pasadena, Tex.

[73] Assignee: Bobbie Scope, Inc., Brownsville, Tex.

[21] Appl. No.: 430,882

[22] Filed: Nov. 2, 1989

Related U.S. Application Data

[63] Continuation-in-part of Ser. No. 300,373, Jan. 23, 1989, abandoned.

[51] Int. Cl.⁵ .................................................. E06C 5/00
[52] U.S. Cl. .................................... 182/90; 182/92; 182/163; 182/127; 280/163
[58] Field of Search .................... 182/90, 91, 92, 163, 182/80, 127; 280/163, 166

[56] References Cited

U.S. PATENT DOCUMENTS

| | | | |
|---|---|---|---|
| 3,033,309 | 5/1962 | Fugere | 182/91 |
| 3,826,337 | 7/1974 | Liptak et al. | 182/91 |
| 3,882,965 | 5/1975 | Loomis et al. | 182/93 |
| 4,079,815 | 3/1978 | Cormier | 182/97 X |
| 4,161,997 | 7/1979 | Norman | 182/127 X |
| 4,191,388 | 3/1980 | Barksdale | 182/91 X |
| 4,236,601 | 12/1980 | Naka | 182/127 X |
| 4,333,547 | 6/1982 | Johansson | 182/90 |
| 4,757,876 | 7/1988 | Peacock | 182/127 X |

FOREIGN PATENT DOCUMENTS

1351470 12/1963 France .............................. 182/163

Primary Examiner—Karen J. Chotkowski
Attorney, Agent, or Firm—Delmar L. Sroufe; Daniel N. Lundeen

[57] ABSTRACT

A portable ladder assembly adapted to be removably mounted in the space between a body and a rail spaced therefrom, e.g. between the body of a conventional truck trailer and tie down rail. The ladder has a main ladder section having an elongated vertical support member and a plurality of step members transversely secured thereto. Means are disposed adjacent a top end of the elongated member for removably securing an upper end of the main ladder section in the space between the body and the tie down rail. Extension members are provided for extending the ladder above the rail to facilitate personnel climbing on the ladder assmbly. An optional lower ladder section having at least one transverse step member supported by at least one elongated member attached to the main ladder section adjacent a lower end thereof is repositionable between at least two different elevations. The lower ladder section may be elevated, for example, to avoid damage which might be caused by striking the grade or objects during transportation of the trailer.

24 Claims, 3 Drawing Sheets

PORTABLE LADDER ASSEMBLY FOR TRUCK TRAILERS

CROSS-REFERENCE TO RELATED APPLICATION

This application is a continuation-in-part of our earlier application U.S. Ser. No. 07/300,373, filed Jan. 23, 1989, and now abandoned entitled Semi Truck Flatbed Trailer Climber, copending herewith, now abandoned.

FIELD OF THE INVENTION

The present invention relates to a portable ladder assembly adapted for removable mounting in a lateral space between a body and a rail spaced therefrom, and particularly to such an assembly which can be mounted in the lateral space between a truck trailer body and the tie down rail thereof. More particularly, the invention relates to such a ladder assembly having a retractable bottom ladder section and an extensible upper handle section.

BACKGROUND OF THE INVENTION

From U.S. Pat. No. 3,882,965 to Loomis et al. it is known to employ a simple ladder adapted to be installed on a truck bed wherein a lower fixed step portion and an upper top and side rail unit are integral therewith, and wherein a swing step is pivotally mounted to internal channel reinforcements for securing the ladder to the truck bed.

U.S. Pat. No. 4,079,815 to Cormier describes an extensible step assembly having steps secured to section of extensible or telescoping arms whereby the assembly can be moved from a retracted compact position to an extended position for use. It is taught that the extensible arms are pivotally secured to a frame which can be bolted directly to a truck or other platform, and there is no provision for personnel support railings or handles extensible above the pivotal attachment to the frame.

Other ladders for vehicles which are similarly permanently mounted thereto, or which require modification of the vehicle, are described in U.S. Pat. No. 4,333,547 to Johansson; U.S. Pat. No. 4,191,388 to Barksdale; U.S. Pat. No. 3,826,337 to Liptak et al.; and U.S. Pat. No. 3,033,309 to Fugere. Moreover, none of the vehicular ladders provide for retractable personnel supports or handles substantially above the top of the runged portion of the ladder assembly.

Other references pertinent to ladder assemblies and constructions include U.S. Pat. No. 3,005,513 to Larson; U.S. Pat. No. 3,093,216 to Dunham; and U.S. Pat. No. 4,261,436 to Stillman, Jr.; and French Patent 1,351,740 to Frassetto.

There is, however, an as yet unfilled need for a portable ladder assembly which is adapted to be removably mounted to a truck trailer. The ladder would be desirably positioned or stored below the top surface of the truck bed when not in use to remain out of the way during transportation of a load on the truck bed, or during loading and unloading. However, the ladder would desirably have support handles extensible above the runged portion of the ladder to facilitate climbing by personnel. In addition, the ladder would desirably be storable or positionable sufficiently above the surface of the road or other grade-level surface so it is not subject to exposure to damaging elements during transportation of the truck trailer to which the ladder assembly is attached. However, the ladder would desirably have a bottom portion adjacent grade level during climbing by personnel to avoid excessive bottom-rung heights. Furthermore, the ladder must be adapted for readily removing the ladder from one truck trailer and quickly installing it on another, ideally without welding, cutting, drilling or similar procedures requiring power tools and/or modification of the truck trailer bed. As far as Applicant is aware, there is no prior art teaching or suggesting such a ladder assembly.

SUMMARY OF THE INVENTION

The present invention provides a portable ladder assembly adapted to be removably mounted in a space between a body and a rail spaced therefrom, such as, for example, between the body of a truck trailer and the conventional tie down rail laterally spaced therefrom. The ladder assembly includes a main ladder section, removable securing means, an upper extension member and, preferably, a lower ladder section. The main ladder section has at least one elongated member and a plurality of step members positioned transversely thereto. The removable securing means are disposed adjacent a top end of the main ladder section for removably securing the upper end of the main ladder section between the rail and the body with the main ladder section depending from the rail. The upper extension member or members are provided for extending the longitudinal member or members of the main ladder section substantially above the rail. Each extension member is retractable substantially below the rail. The preferred lower ladder section has at least one transverse step member supported by at least one elongated member attached to the main ladder section adjacent a lower end thereof. The lower ladder section is repositionable to at least two different elevations. In another aspect, the invention provides a portable ladder assembly adapted to be removably mounted in a space between the edge of a truck trailer and a tie down rail spaced therefrom. The ladder assembly includes a main ladder section, means disposed adjacent top ends of outer members of the main ladder section for removably securing the main ladder section in the space, a pair of spaced-apart, upper extension members, and a hingedly connected lower ladder section. The main ladder section has a pair of outer elongated members and a plurality of transverse step members extending laterally therebetween. The securing means includes a bar affixed to one side of the respective top end of the outer members. A lip is disposed at the top end of the bar for engaging a top edge of the rail, and at least one jackbolt is engaged by the bar for extension between the rail and the edge of the truck trailer to securely wedge the top end of the main ladder section outside member between the rail and the edge of the truck trailer. The outside members are tubular, and the extension members are telescopically engaged thereby for extending the outer members above the rail into an operative position, and retracting the extension members into the outside members for storage in an inoperable position. The lower ladder section is hinged to the lower end of the main ladder section for pivoting between a lowered, operative position and a raised, inoperative position. The lower ladder section may be spring biased for facilitating repositioning of the lower ladder section, and may also include locking means for maintaining it in either the raised or lowered position.

In still another aspect, the invention provides a portable ladder assembly for use with a truck trailer having an outer peripheral edge and a tie down rail spaced therefrom. The ladder assembly includes a main ladder section, removable securing means disposed adjacent a top end of the main ladder section, extension members for extending above the tie down rail and a lower ladder section slidably engaged by the upper ladder section and removably secured by means for bolting the lower ladder section in place. The lower ladder section may have a tubular central longitudinal member telescopically engaged by a corresponding tubular central longitudinal member of the main ladder section.

In yet another aspect, the invention provides a truck trailer having a ladder assembly mounted thereto. The truck trailer has a rail spaced from an outer peripheral edge. The ladder assembly includes a main ladder section, securing means, extension members and a lower ladder section. The main ladder section has a pair of outer elongated, tubular members and a plurality of transverse step members extending laterally therebetween. The securing means are disposed adjacent top ends of the outer members for securing, preferably removably securing, an upper end of the main ladder section between the tie down rail and peripheral edge of the truck trailer with the main ladder section depending from the rail. The extension members are provided for extending the outer members above the rail. The extension members are downwardly retractable into an inoperative position. The extension members may be telescopically engaged by the outer ladder members to achieve this function. The lower ladder section has at least one transverse step member supported by at least one elongated member. The lower ladder section is attached to the main ladder section adjacent a lower end thereof. The lower ladder section is repositionable to at least two different elevations. In one embodiment of the truck trailer, the ladder assembly is provided with a hingedly attached lower ladder section for pivoting between a lowered, operative position and a raised, inoperative position. In another embodiment, the lower ladder section is slidably engaged by the upper ladder section and removably secured by means for bolting the lower ladder section in place.

DETAILED DESCRIPTION OF THE PREFERRED EMBODIMENTS

Figure 1:
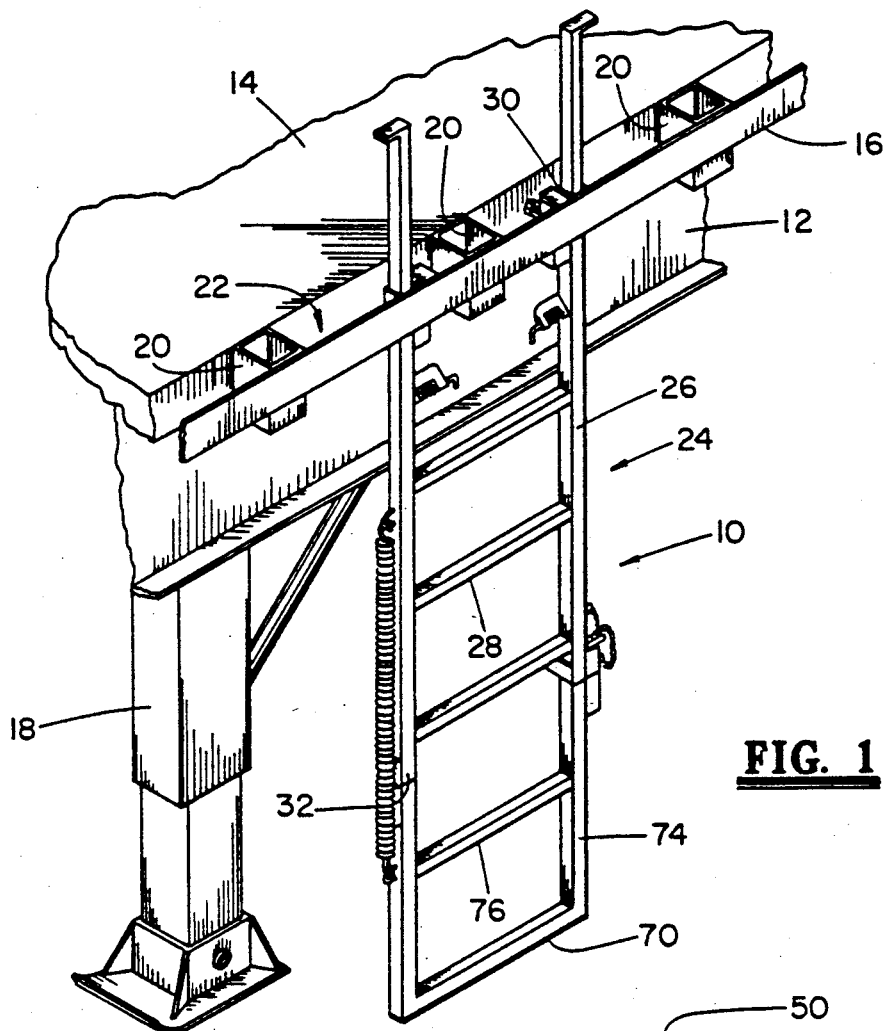
FIG. 1 is a perspective view of a truck trailer-ladder assembly, according to the present invention, wherein the ladder assembly is mounted in an operative position to a truck trailer which is shown partially cut away.
Figure 2:
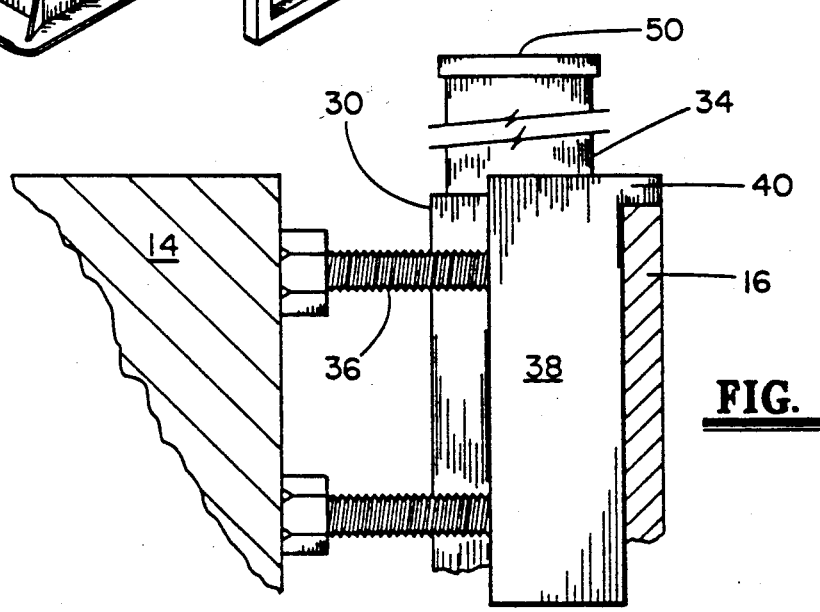
FIG. 2 is a side elevation showing a detail of the rail attachment means of the ladder assembly of FIG. 1.

With reference to the drawings wherein like reference numerals are used to indicate like parts, a truck trailer-ladder assembly is illustrated in FIGS. 1-5. The ladder assembly 10 is mounted on a truck trailer 12. The truck trailer 12 is of a cOnventional type commonly in use with semi trucks and includes a body 14 and a tie down rail 16 Which is spaced therefrom. The trailer 12 may include a conventional jack 18 for supporting one end of the trailer 12 (when not attached to a semi truck) and a bed supporting member 19. The rail 16 is conventionally secured to the flat bed body 14 by attachment, e.g. welding, bolting, riveting or the like, along spacer elements 20 to provide a lateral space 22 between the flat bed body 14 and the rail 16.

The ladder assembly 10 includes a main or upper ladder section 24 generally secured to the flat bed 12 in the space 22 and depending therefrom. The main ladder section 24 includes a pair of longitudinal members 26 generally positioned on either side of the upper ladder section 24. Transverse step members 28 are securely supported by the longitudinal members 26. The longitudinal members 26 are generally tubular, preferably of a square cross-section and terminate in upper and lower ends 30 and 32 respectively. The upper end 30 of the elongated members 26 are secured adjacent the rail 16 by means of jackbolts 36 which are threadedly received in transverse bores (see FIG. 5) formed in longitudinal bar 38 which is securely affixed, e.g. by welding, riveting, bolting or the like, to elongated members 26 adjacent upper end 30 thereof, for example. Each bar 38 is provided with an upper lip 40 for engaging an upper surface of the rail 16.

Figure 5:
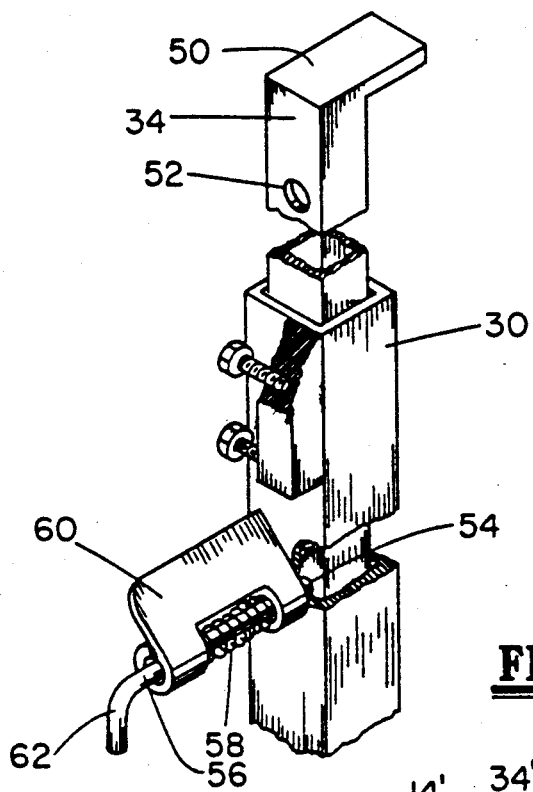
FIG. 5 is a perspective view, partly in section, of a portion of a ladder assembly according to the present invention.

An extension member 34 is telescopically received in each of the generally tubular elongated members 26 as best seen in FIG. 5. Each extension member 34 is provided with an upper lip 50 which is generally larger in cross-section than the tubular member 30. Each extension member is further provided with respective upper and lower holes or detents 52 and 54 provided for receiving pin 56 to position extension members 50 in a respective upper, operable position or lowered, inoperative position. The pin 56 is biased by spring 58 in pin housing 60 fixedly secured adjacent elongated member 26. Pin 56 may be provided with a curved portion or handle 62 to facilitate retraction of the pin 56 from the detents 52 and 54.

Figure 3:
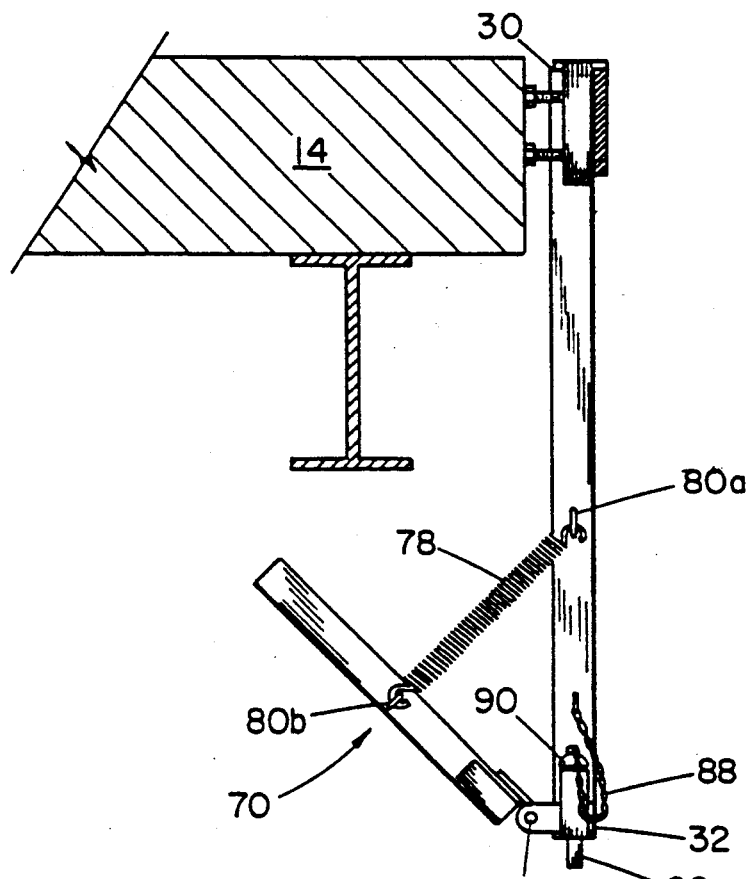
FIG. 3 is a side elevation of a truck trailer-ladder assembly according to the present invention.
Figure 4:
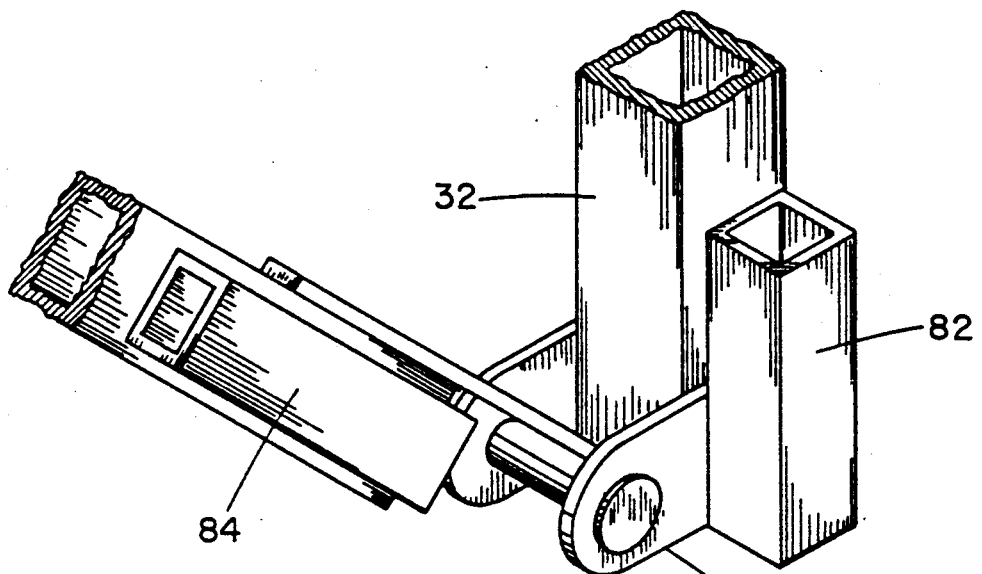
FIG. 4 is a perspective view, partly in section, of a hinge for a lower ladder section in a ladder assembly according to the present invention.

Lower ladder section 70 is hingedly attached adjacent lower ends 32 of elongated members 26 by means of, for example, hinge assembly 72, as best illustrated in FIGS. 3 and 4. The lower ladder section 70 includes elongated members 74 generally pivotable in a common plane with the respective elongated member 26. A plurality of transverse step members 71 are secured between the elongated members 74. The lower ladder section 70 is biased by spring 78. Opposite ends of the spring 78 are spaced away from the hinge assembly 72 at spring connections 80a, 80b. The axis of revolution of hinge assembly 72 is offset from a common longitudinal axis of the longitudinal members 26 and 74 in aligned disposition. Upper and lower respective parallel bolt housings 82, 84 are securely affixed to elongated member 26 adjacent lower end 32 thereof, and to an upper end of lower ladder section 70 elongated member 74. The bolt housings 82, 84 are provided with an aligned bore therethrough for receiving locking pin 86 which is provided with a chain 88 secured to elongated member 24 and enlarged head 90 of the pin 86.

The ladder assembly 10 is readily installed in a mounted position on a trailer 12 or other structure having a similar lateral space 22. The ladder assembly 10 is positioned so that the upper end 34 is disposed between the trailer body 14 and the rail 16 and the lip 40 of the bar 38 is engaged on a top surface of the rail 16. The jackbolts 36 are then extended with a wrench or other tool so that the bar 38 is tightly pressed against the rail 16. The jackbolts 36 may be right-handedly threaded to facilitate the installation. In this manner, the ladder assembly 10 is held in place both by the extension of the jackbolts 36 which tend to wedge the ladder between the rail 16 and the trailer body 14, and also by engagement of the lip 40 on the rail 16. For maximum strength, the ladder assembly 10 is preferably positioned so that an elongated member 26 is positioned on either side of the spacer element 20. Also, the ladder assembly 10 should be positioned sufficiently away from any members depending from the trailer 12, such as, for example, jack-up leg 18, so that any potential interference with the optional hinged bottom section 70 of the ladder assembly 10 is thereby avoided.

Removal of the ladder assembly 10 is accomplished by loosening the jackbolts 36. Since the mounting and removal procedure of the ladder assembly 10 is rapid and easy, the ladder assembly 10 may be readily moved from trailer to trailer. This is particularly attractive for a truck driver transporting different owners' trailers, none of which are typically provided with a climbing device such as the ladder assembly 10.

During transportation and other periods where the ladder assembly is not being used, it is normally maintained in an inoperative position as illustrated in FIG. 3 such that the bottom ladder portion 70 is pivoted upwardly and out of the way so as to avoid being struck by elevated road sections and debris. Similarly, the extention members 34 are retracted into main members 26 so as not to interfere with the use of the surface of the bed 14. When it is desired to use the ladder assembly 10 for climbing onto the flatbed body 14, the bottom ladder section 70 is pivoted downwardly and outwardly so that the side members 74 are aligned with the elongated members 26 of the main ladder section 24. The pin 86 is then positioned in the sleeves 82 and 84 to lock the bottom ladder section 70 in alignment with the upper ladder section 24 in an operative position. The pin 86 serves to prevent the bottom ladder section 70 from pivoting out of the operative position while in use. The spring 78 is normally provided with sufficient tension necessary only to hold the bottom ladder section 70 in an inoperative position, whereby the tension in spring 78 is easily overcome by operating personnel. Thus, the bottom ladder section 70 may be moved or pivoted from its operative position as illustrated in FIG. 1 to its inoperative position as illustrated in FIG. 3, simply by reversing the steps of the foregoing procedure, i.e. removing the pin 86 and pivoting the bottom ladder section 70 from the position seen in FIG. 1 to that in FIG. 3.

The extension members 34 are normally maintained in their retracted, inoperative position as illustrated in FIG. 3. Each extension member 34 is held in its retracted position by means of upper hole 52 formed in extension member 34 and the pin 56 received therein. The extension member 34 is extended into the operative position illustrated in FIG. 1 by pulling outwardly the pin 56 from the upper hole 52 with the handle 62, and pulling upwardly the extension member 34 by means of lip which protrudes transversely over the upper end of the elongated member 26. The upward extension of the extension member 34 is continued until the pin 56 is aligned with the lower hole 54 formed in a lower end of the extension member 34. The bias of spring 58 automatically engages the pin 56 in the hole 54, thereby securing the extension member 34 in its extended, operative position, as best illustrated in FIG. 1. When each extension member 34 is thus extended into the operative position, personnel climbing on the ladder assembly 10 can conveniently use the extension members 34 as a railing or handle for supporting and stabilizing the upper portion of the body. This is particularly advantageous when the truck trailer 12 is a flatbed and there are no upper support means otherwise available.

When it is desired to retract the extension members 34 into their retracted or inoperative position as illustrated in FIG. 3, the reverse procedure is employed. The pin 56 is retracted from the hole 54 by means of the handle 62, and the extension member 34 is permitted to slidably retract into the elongated member 26 until the pin 56 is aligned with the upper hole 52 and engaged therewith. The lip 50 also serves to prevent the extension member 34 from falling irretreivably into the body of the elongated member 34 if, for some reason, the hole 52 is not engaged by the pin 56.

Figure 6:
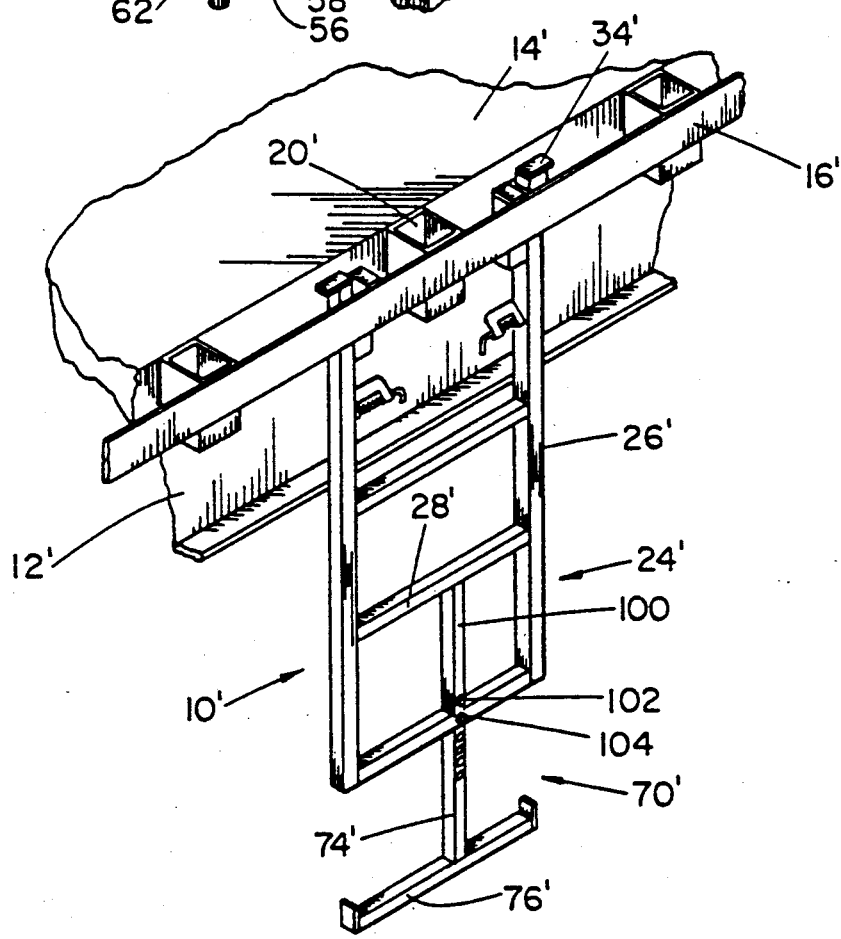
FIG. 6 is an alternate embodiment of a ladder assembly according to the present invention wherein the lower ladder section is telescopically secured to the main ladder section.

The foregoing embodiment depicted in FIGS. 1-5 is adapted for use primarily with a relatively high, long trailer normally towed behind a semi truck. However, when it is desired to use the ladder assembly of the present invention with a mini rig typically towed behind a smaller truck such as a pick-up, which typically has its upper surface closer to grade level than a semi truck trailer, the alternate embodiment of the ladder assembly 10' illustrated in FIG. 6 is preferably used. The ladder assembly 10' is adapted for use with a mini rig trailer 12' which has a body 14' and a tie down rail 16' spaced therefrom similar to that illustrated in FIG. 1. The ladder assembly 10' is similar to that of ladder assembly lo as illustrated in FIGS. 1-5. The ladder assembly 10', however, is typically shorter than the ladder assembly 10 normally used in connection with semi truck trailers which are typically higher above grade. Thus, the outer elongated members 26' of the ladder assembly 10' may be shorter and may have fewer rungs or transverse members 28'. Accordingly, to provide the same amount of extension with the extension members 34' the lower hole 54' (not shown) is positioned closer to the lower end of the extension member 34'. A primary difference, however, between the embodiments of FIGS. 1-5 and FIG. 6 is that the ladder assembly 10 ' in FIG. 6 is provided with an alternate lower ladder section 70'. The lower ladder section 70' has a longitudinal member 74' and a transverse member 76' secured at a lower end of transverse member 74'. The upper ladder section 24' is provided with a central longitudinal member 100 adapted to telescopically receive the elongated member 74' of the lower section 70'. The cross-section of the central longitudinal member 100 and the elongated member 74' of the lower ladder section 70' are preferably rectangular to inhibit twisting of the lower ladder section 70' with respect to the upper ladder section 24'. A pair of apertures are formed in register in opposite walls of the central longitudinal member 100 adjacent a lower end thereof for receiving bolts 102 and 104. A plurality of corresponding pairs of apertures are formed in opposite front and back walls of elongated member 74'. This permits the placement of the bolts 102 and 104 to adjust the vertical height of the transverse member 76' with respect to the bottom of upper ladder section 24', depending on the elevation of the top of the bed 14' with respect to grade level. It is not normally necessary to remove or adjust the bottom ladder section 74' when not in use as this is not typically subject to the same risk of damage as is the lower ladder section 74 employed in conjunction with the semi truck trailer 12. If the tie down rail 16' is too low, however, the lower ladder section 74' may be removed altogether.

The foregoing description is illustrative and explanatory of the invention, and many variations and modifications thereof will occur to those skilled in the art in view of the foregoing disclosure. For example, the ladder assembly may be permanently affixed or mounted to a trailer if removability is not desired, and the ladder may be adapted for use with a wide variety of structures and platforms other than truck trailers. All such variations within the scope or spirit of the appended claims are intended to be embraced thereby.

We claim:

1. A portable ladder assembly adapted to be removably mounted in a space between a body and a rail spaced therefrom, comprising:
   a main ladder section having an elongated member and a plurality of step members transversely secured thereto;
   means disposed adjacent a top end of said elongated member for removably securing an upper end of said main ladder section between the rail and the body with said main ladder section depending from the rail, said securing means including a lip for engaging an upper surface of the rail and extension means for wedging said tip end of said elongated member between the rail and the body; and
   an extension member for extending above the rail into an operative position for use as a handle, said extension member being retractable below the rail into an inoperative position.

2. The ladder assembly of claim 1, further comprising:
   a lower ladder section having at least one transverse step member supported by at least one elongated member attached to said main ladder section adjacent a lower end thereof, said lower ladder section being repositionable to at least two different elevations.

3. The ladder assembly of claim 1, wherein said securing means includes a bar affixed adjacent the respective top end of said main ladder section elongated member said lip is disposed at a top end of said bar, and said extension means comprises a jackbolt engaged by said bar for extension between the rail and the body and for thereby securely wedging said top end of said main ladder section elongated member between the rail and the body.

4. The ladder assembly of claim 1, wherein said main ladder section comprises a pair of said elongated members which are tubular, and a pair of said extension members which are telescopically engaged thereby.

5. The ladder of claim 4, further comprising stop means for releasably securing said extension members in extended and retracted positions.

6. The ladder assembly of claim 5, wherein said extension members have a top lip for facilitating extension thereof from said retracted position.

7. The ladder assembly of claim 2, wherein said lower ladder section is hingedly attached to said lower end of said main ladder section for pivoting between a lowered, operative position and a raised, inoperative position.

8. The ladder assembly of claim 7, wherein said lower ladder section is spring-biased for maintaining said lower ladder section in said raised and lowered positions.

9. The ladder assembly of claim 7, further comprising means for locking said lower ladder section in said lowered position.

10. The ladder assembly of claim 2, wherein said lower ladder section is slidably engaged by said upper ladder section and removably secured by bolting said lower ladder section in place.

11. The ladder assembly of claim 10, wherein said lower ladder section has a tubular central longitudinal member telescopically engaged by a corresponding tubular central longitudinal member of said main ladder section.

12. A truck trailer, comprising:
   a rail spaced from an outer peripheral edge of the trailer; and
   a ladder assembly mounted to said rail, said ladder assembly including
   (i) a main ladder section having an elongated member and a plurality of step members transversely secured thereto, (ii) means disposed adjacent a top end of said elongated member for securing an upper end of said main ladder section adjacent the rail and the peripheral edge with the main ladder section depending therefrom, said securing means including a lip for engaging an upper surface of said rail and extension means for wedging said top end of said elongated member between said rail and said edge, and (iii) an extension member for extending above the rail into an operative position for use as a handle, said extension member being retractable below the rail into an inoperative position.

13. The truck trailer of claim 12, wherein said ladder assembly is removably mounted between said edge and said rail.

14. The truck trailer of claim 12, wherein said securing mean includes a bar affixed adjacent the respective top end of said main ladder section elongated member, said lip is disposed at a top end of said bar, and said extension means includes a jackbolt engaged by said bar for extension between the rail and said edge and for thereby securely wedging said top end of said main ladder section elongated member between said rail and said edge.

15. The truck trailer of claim 12, wherein said ladder assembly comprises a lower ladder section having at least one transverse step member supported by at least one elongated member attached to said main ladder section adjacent a lower end thereof, said lower ladder section being repositionable to at least two different elevations.

16. The truck trailer of claim 12, wherein said main ladder section comprises a pair of said elongated members which are tubular, and a pair of said extension members which are telescopically engaged thereby.

17. The truck trailer of claim 16, wherein said ladder assembly further comprises stop means for releasably securing said extension members in extended and retracted positions.

18. The truck trailer of claim 17, wherein said extension members have a top lip for facilitating extension thereof from said retracted position.

19. The truck trailer of claim 15, wherein said lower ladder section is hingedly attached to said lower end of said main ladder section for pivoting between a lowered, operative position and a raised, inoperative position.

20. The truck trailer of claim 19, wherein said lower ladder section is spring biased for maintaining said lower ladder section in said raised and lowered positions.

21. The truck trailer of claim 19, further comprising means for locking said lower ladder section in said lowered position.

22. The truck trailer of claim 15, wherein said lower ladder section is slidably engaged by said upper ladder section and removably secured by bolting said lower ladder section in place.

23. The truck trailer of claim 22, wherein said lower ladder section has a tubular central longitudinal member telescopically engaged by a corresponding tubular central longitudinal member of said main ladder section.

24. A portable ladder assembly adapted to be removably mounted in a space between a body and a rail spaced therefrom, comprising:

a main ladder section having an elongated member and a plurality of step members transversely secured thereto;

means disposed adjacent a top end of said elongated member for removably securing an upper end of said main ladder section between the rail and the body with said main ladder section depending from the rail;

an extension member for extending above the rail, said extension member being retractable below the rail; and a lower ladder section having at least one transverse step member supported by at least one elongated member attached to said main ladder section adjacent a lower end thereof, said lower ladder section being repositionable to at least two different elevations, wherein said lower ladder section is hingedly attached to said lower end of said main ladder section for pivoting between a lowered, operative position, and a raised, inoperative position.

* * * * *